(12) United States Patent
Perosino et al.

(10) Patent No.: US 9,365,264 B2
(45) Date of Patent: Jun. 14, 2016

(54) HINGE WITH SECURING FEATURES

(75) Inventors: Gregory Perosino, Torrington, CT (US);
Joseph Hamilton, Sweetwater, TN (US);
Timothy Hamilton, Lenoir City, TN (US);
David Mazzarelli, Torrington, CT (US);
Nicholas Cegelka, Torrington, CT (US);
Michael Hissong, Torrington, CT (US);
Brian DeLisle, Barkhamsted, CT (US)

(73) Assignee: COMMERCIAL SEWING, INC., Torrington, CT (US)

( * ) Notice: Subject to any disclaimer, the term of this patent is extended or adjusted under 35 U.S.C. 154(b) by 215 days.

(21) Appl. No.: 13/611,810

(22) Filed: Sep. 12, 2012

(65) Prior Publication Data

US 2013/0243520 A1    Sep. 19, 2013

Related U.S. Application Data

(60) Provisional application No. 61/533,574, filed on Sep. 12, 2011, provisional application No. 61/665,701, filed on Jun. 28, 2012.

(51) Int. Cl.
*F16C 11/00* (2006.01)
*F16D 3/00* (2006.01)
*B63B 17/02* (2006.01)
*E04H 15/06* (2006.01)
(Continued)

(52) U.S. Cl.
CPC ............... *B63B 17/02* (2013.01); *E04H 15/06* (2013.01); *F16B 1/00* (2013.01); *F16B 2/185* (2013.01); *Y10T 403/32254* (2015.01)

(58) Field of Classification Search
CPC .... Y10T 403/32254; F16B 1/00; E04H 15/06
USPC .......... 403/84, 119, 150, 151, 152, 154, 161, 403/163; 248/288.11, 291.1; 16/326, 327; 135/120.3, 139, 140, 143–144, 151, 135/154
See application file for complete search history.

(56) References Cited

U.S. PATENT DOCUMENTS 2,823,684 A   2/1958   Sartori
3,001,212 A   9/1961   Towne
(Continued)

OTHER PUBLICATIONS

Non-Final Office Action dated Apr. 16, 2014 in U.S. Appl. No. 13/611,696.
(Continued)

*Primary Examiner* — Gregory Binda
*Assistant Examiner* — Nahid Amiri
(74) *Attorney, Agent, or Firm* — Cantor Colburn LLP

(57) ABSTRACT

A hinge having securing features includes a first hinge body portion including a first frame association end and a nesting cavity, the first frame association end and the nesting cavity being disposed at opposite ends of the first hinge body portion, a second hinge body portion defining a second frame association end and a nesting body configured for nesting in the nesting cavity of the first hinge body portion, the second frame association end and the nesting body being disposed at opposite ends of the second hinge body portion, wherein the first hinge body portion and the second hinge body portion are rotatably associated via a pivot point, and at least one securing feature configured for securing the nesting body within the nesting cavity in a manner that prevents rotation of the first body portion relative to the second body portion about the pivot point.

9 Claims, 7 Drawing Sheets

(51) Int. Cl.
*F16B 1/00* (2006.01)
*F16B 2/18* (2006.01)

(56) References Cited

U.S. PATENT DOCUMENTS

| | | | | |
|---|---|---|---|---|
| 4,286,353 | A * | 9/1981 | Roche | 16/341 |
| 4,593,641 | A | 6/1986 | Adams et al. | |
| 4,683,900 | A | 8/1987 | Carmichael | |
| 4,926,782 | A | 5/1990 | Lacy | |
| 4,970,751 | A * | 11/1990 | Fisher et al. | 15/250.32 |
| 5,240,020 | A | 8/1993 | Byers | |
| 5,681,045 | A * | 10/1997 | Liao | 273/400 |
| 5,768,960 | A * | 6/1998 | Archuleta | 81/177.8 |
| 5,803,104 | A | 9/1998 | Pollen | |
| 5,918,613 | A | 7/1999 | Larson | |
| 6,142,438 | A | 11/2000 | Cooper et al. | |
| 6,216,317 | B1 * | 4/2001 | Chen | 16/430 |
| 6,257,261 | B1 * | 7/2001 | Johnson | 135/96 |
| 6,349,666 | B1 | 2/2002 | Hastings | |
| 6,439,150 | B1 | 8/2002 | Murphy et al. | |
| 6,478,500 | B1 * | 11/2002 | Farenholtz | 403/84 |
| 6,711,783 | B2 * | 3/2004 | LeMole | 16/352 |
| 6,799,529 | B1 | 10/2004 | Willis | |
| 6,820,569 | B2 | 11/2004 | Warfel et al. | |
| 6,907,642 | B1 * | 6/2005 | Czipri | 16/367 |
| 6,928,766 | B1 * | 8/2005 | Goebel et al. | 43/27.4 |
| 6,945,188 | B2 | 9/2005 | Eck et al. | |
| 7,040,587 | B2 | 5/2006 | Thompson et al. | |
| 7,401,569 | B2 * | 7/2008 | Jones | 114/361 |
| 7,418,918 | B2 | 9/2008 | Bierbower et al. | |
| 7,571,691 | B2 | 8/2009 | Russikoff | |
| 7,685,960 | B1 | 3/2010 | Carusello et al. | |
| 7,895,964 | B2 | 3/2011 | Russikoff | |
| 7,950,342 | B2 | 5/2011 | Russikoff | |
| 8,066,388 | B2 | 11/2011 | Yeh et al. | |
| 8,297,484 | B2 | 10/2012 | Jesewitz et al. | |
| 8,597,245 | B2 * | 12/2013 | Jeter et al. | 604/135 |
| 9,096,291 | B2 | 8/2015 | Perosino et al. | |
| 2006/0052670 | A1 * | 3/2006 | Stearns et al. | 600/216 |
| 2008/0022916 | A1 | 1/2008 | Borges et al. | |
| 2015/0291259 | A1 | 10/2015 | Perosino et al. | |

OTHER PUBLICATIONS

Notice of Allowance, U.S. Appl. No. 13/611,696, dated Mar. 26, 2015.

* cited by examiner

HINGE WITH SECURING FEATURES

CROSS-REFERENCE TO RELATED APPLICATIONS

This application is related to and claims the benefit of U.S. Provisional Patent Application Ser. No. 61/533,574 filed on Sep. 12, 2011 and U.S. Provisional Patent Application Ser. No. 61/665,701 filed on Jun. 28, 2012, the entire contents of which are herein incorporated by reference.

FIELD

The disclosure relates generally to a hinge, and more particularly to a hinge with securing features.

BACKGROUND

Retractability of a bimini top for a tower structure that is associable with a watercraft is a desirable feature in that it allows the top to be stored in an efficient manner. Typically, such retractability is achieved via a hinges that hold tensioned frame portions of the top together. Hinges that are currently on the market and used for this purpose employ flat against flat hinge portion surfaces that are held together via an Axel pin (see prior art FIG. 1).

However, such known hinge assemblies have drawbacks in that there is no connection between the two hinge portions or cylinders, resulting in both slack and stress (from the tension of the frame towards a folded/stowed position) in a relatively small support area. This slack and stress can cause the pin to bend and the hinge to fail at holding the frame in an open position.

Accordingly, a need exists in the art for hinge that more effectively holds the frame in an open position.

SUMMARY

Disclosed is a hinge with securing features, the hinge including a first hinge body portion including a first frame association end and a nesting cavity, the first frame association end and the nesting cavity being disposed at opposite ends of the first hinge body portion, a second hinge body portion defining a second frame association end and a nesting body configured for nesting in the nesting cavity of the first hinge body portion, the second frame association end and the nesting body being disposed at opposite ends of the second hinge body portion, wherein the first hinge body portion and the second hinge body portion are rotatably associated via a pivot point, and at least one securing feature configured for securing the nesting body within the nesting cavity in a manner that prevents rotation of the first body portion relative to the second body portion about the pivot point.

Also disclosed is a hinge with securing features, the hinge including a first hinge body portion defining a first frame association end and a nesting cavity, the first frame association end and the nesting cavity being disposed at opposite ends of the first hinge body portion, a second hinge body portion defining a second frame association end and a nesting body configured for nesting in the nesting cavity of the first hinge body portion, the second frame association end and the nesting body being disposed at opposite ends of the second hinge body portion, wherein the first hinge body portion and the second hinge body portion are rotatably associated via a pivot point, at least one outer pin opening defined by the first hinge body portion, the at least one outer pin opening communicating the nesting cavity with an environment ambient the said first hinge body portion, at least one inner pin opening defined by the nesting body, the at least one inner pin opening being alignable with the at least one outer pin opening when the nesting body is nested in the nesting opening, and at least one pin configured for disposal through the at least one outer pin opening into the at least one inner pin opening when the nesting body is nested in the nesting opening, the disposal of the at least one pin securing the nesting body within the nesting cavity in a manner that prevents rotation of the first body portion relative to the second body portion about the pivot point.

Further disclosed is a hinge with securing features, the hinge including a first hinge body portion defining a first frame association end and a nesting cavity, the first frame association end and the nesting cavity being disposed at opposite ends of the first hinge body portion, a second hinge body portion defining a second frame association end and a nesting body configured for nesting in the nesting cavity of the first hinge body portion, the second frame association end and the nesting body being disposed at opposite ends of the second hinge body portion, wherein the first hinge body portion and the second hinge body portion are rotatably associated via a pivot point, and a spring loaded latch extending from the first body portion, the spring loaded latch being configured to prevent rotation of the first body portion relative to the second body portion about the pivot point via interaction with a flange extending from the second body portion.

DETAILED DESCRIPTION

Figure 1:
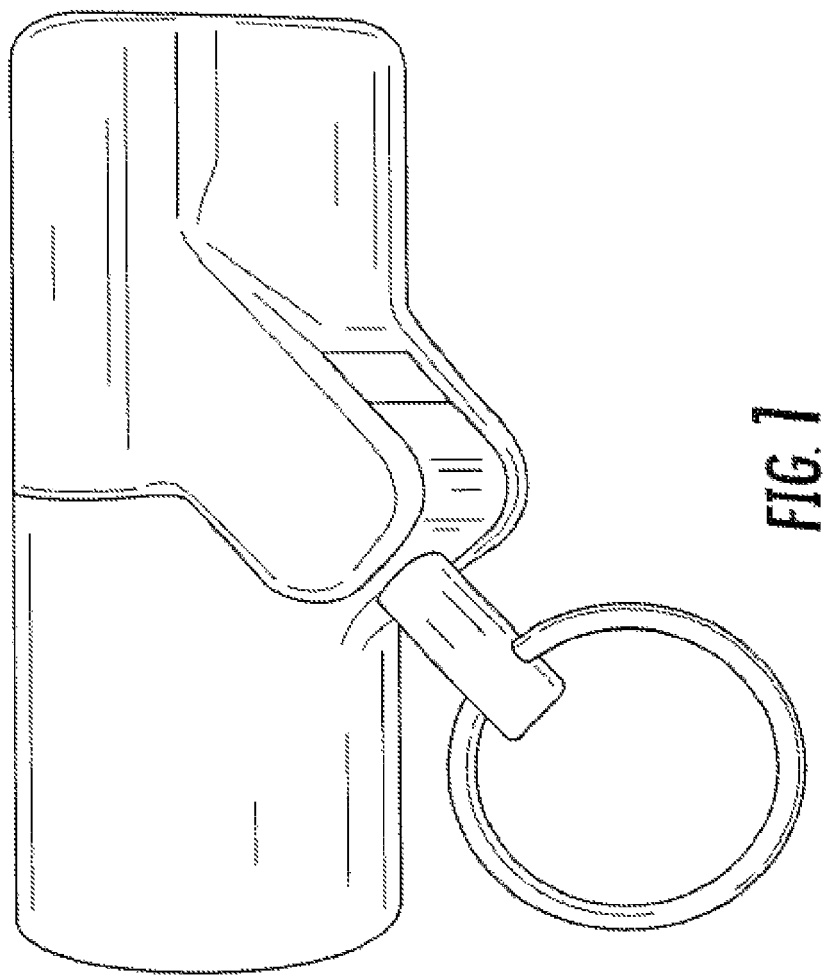
FIG. 1 is a perspective view a hinge in accordance with the prior art.
Figure 2:
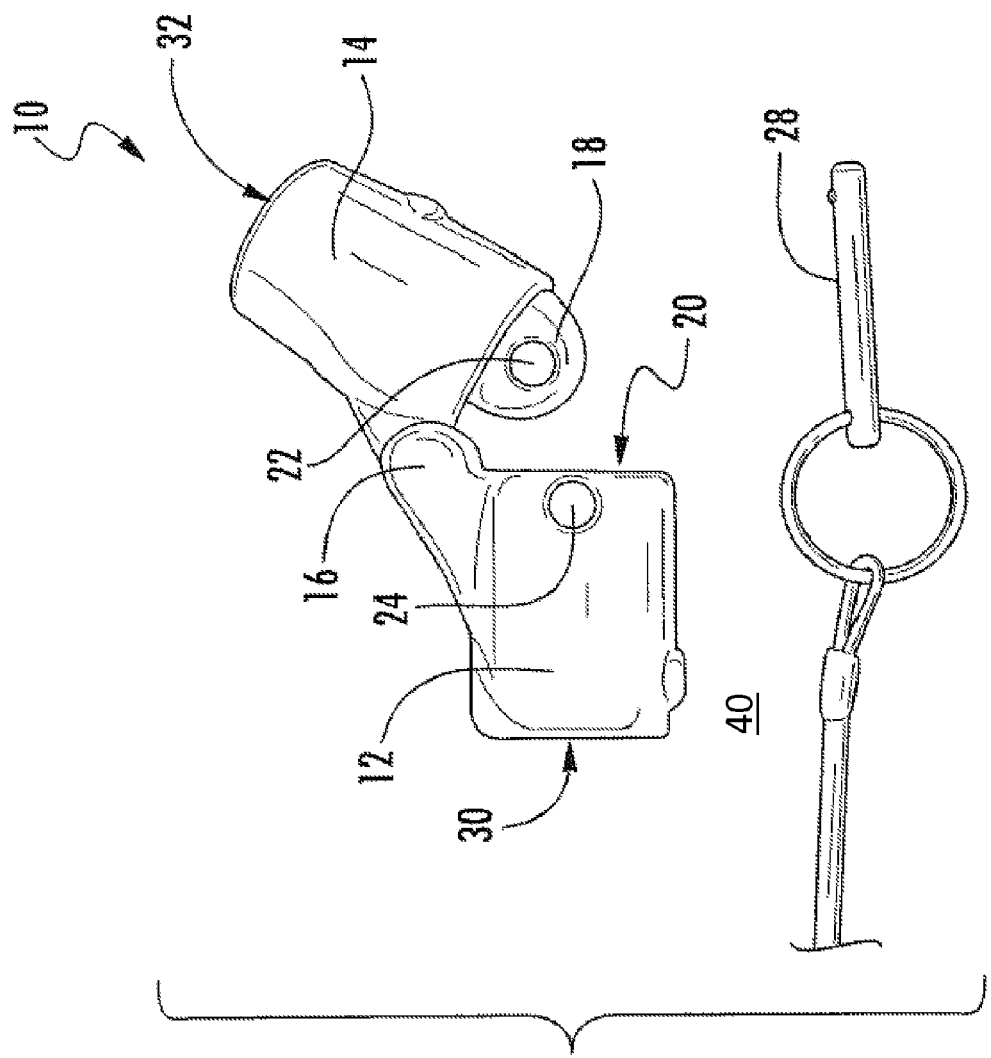
FIG. 2 is a plan view of a hinge in accordance with an exemplary embodiment, the hinge being shown in an open configuration.
Figure 3:
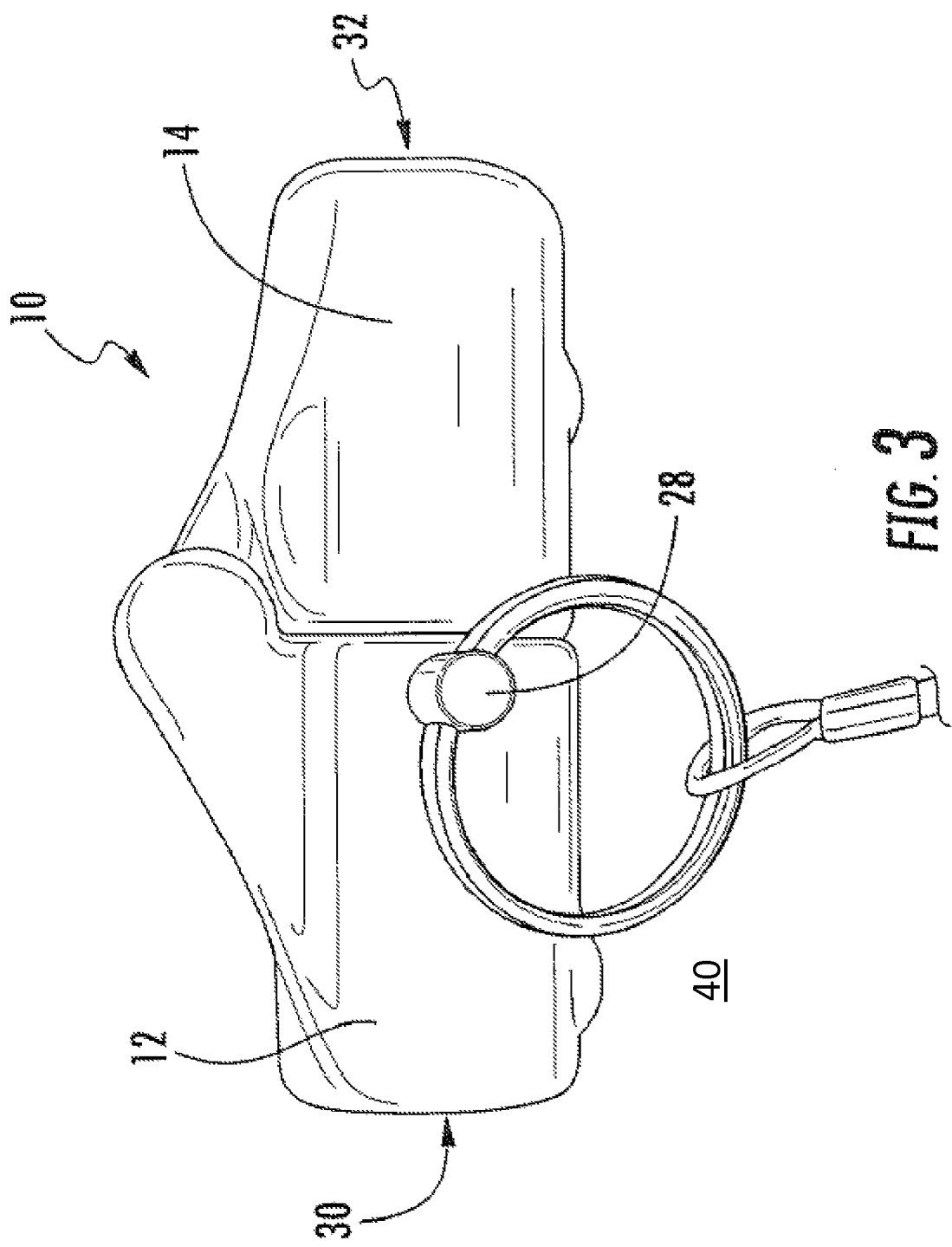
FIG. 3 is a perspective view of the hinge as shown in FIG. 1, the hinge being shown in a closed configuration and in association with a frame.

Referring to FIGS. 2 and 3, a hinge device 10 for use with a bimini top is shown. The hinge device 10 includes a first hinge body portion 12, a second hinge body portion 14, and a pivot point 16 that associates the first and second body portions 12, 14. The pivot point 16 may be any conventional hinge association means (i.e. a riveted, pinned, or otherwise mechanically and rotatably fastened piece such as that shown in FIG. 4) that allows the first and second body portions 12, 14 to freely rotate relative to each other.

The second body portion 14 includes a nesting body portion 18 that is configured for nesting within a nesting cavity 20 defined by the first body portion 12. In FIG. 2, the hinge device 10 is open and the nesting body 18 is visible. As shown in FIG. 2, the nesting body 18 includes an inner pin opening 22 that traverses an entire width of the nesting body 18. As is also shown in FIG. 2, the first body portion 12 includes a first outer pin opening 24 and a second outer pin opening 26 (shown in FIG. 6) disposed at opposing widths of the first body portion 12 and aligned for pin entry. In an exemplary embodiment, the first outer pin opening 24 and second outer pin opening 26 are positioned at either end of a diameter traversing the circular/cylindrical nesting cavity 20. These outer pin openings 24, 26 communicate an ambient environment 40 around the first body portion 12 with the nesting cavity 20.

Figure 6:
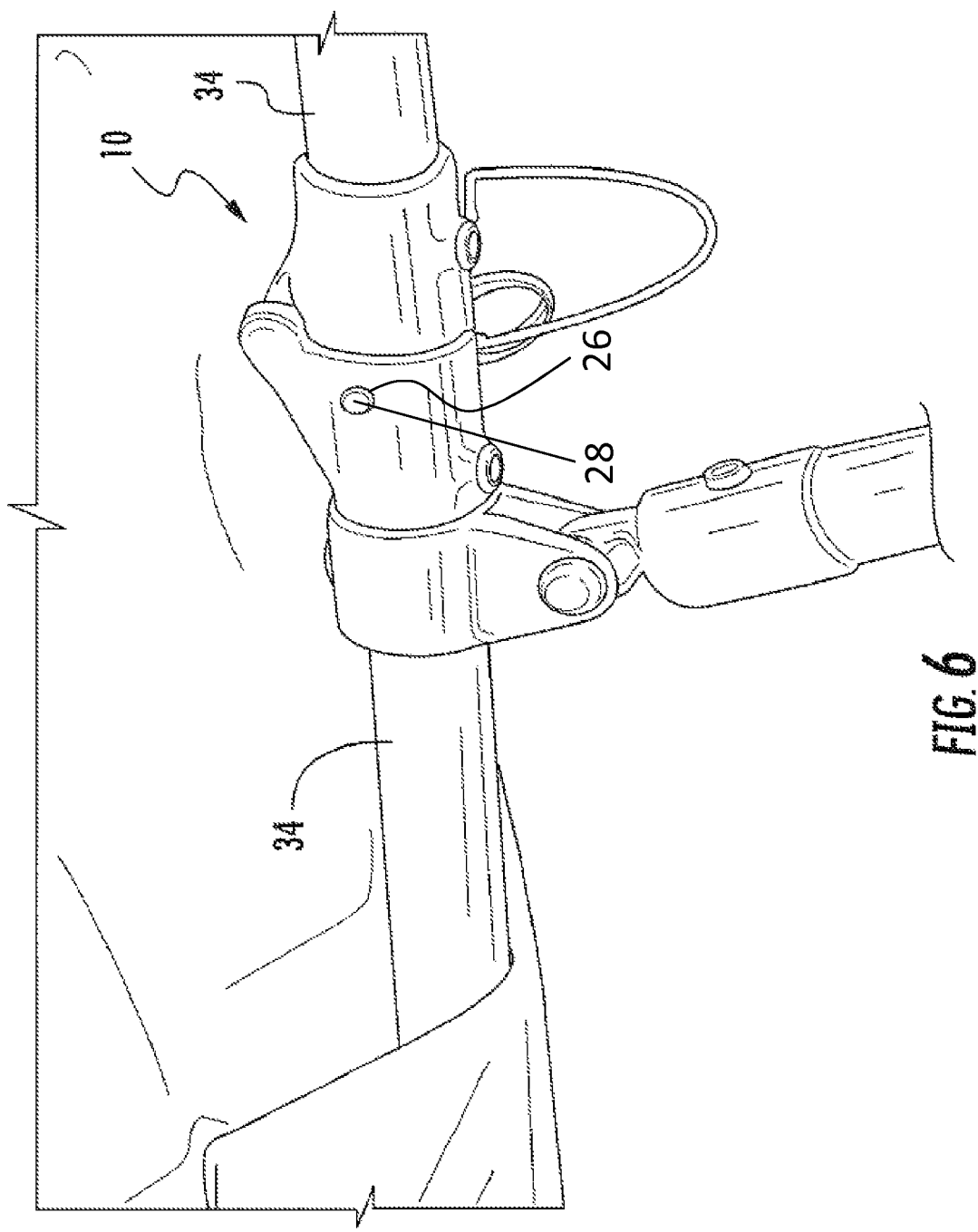
FIG. 6 is a perspective view of the hinge as shown in FIG. 1, the hinge being shown in a closed configuration and in association with a frame.

Referring to FIG. 3, the hinge 10 is shown in a closed position, with the nesting body 18 being fully inserted/nested within the nesting cavity 20. When in this position, the outer pin openings 24, 26 and inner pin opening 22 align in a manner that allows a pin 28 (such as a lanyard pin) to traverse an entire width of the hinge device 10 via disposal through the first outer pin opening 24, through the inner pin opening 22 (disposed in the nesting cavity 20), and through the second outer pin opening 26 (as shown in FIG. 6). Insertion of the pin 28 in this manner essentially locks the hinge 10 in the closed position shown in FIG. 3, preventing rotation of the first body portion 12 relative to the second body portion 14 about the pivot point 16.

Figure 4:
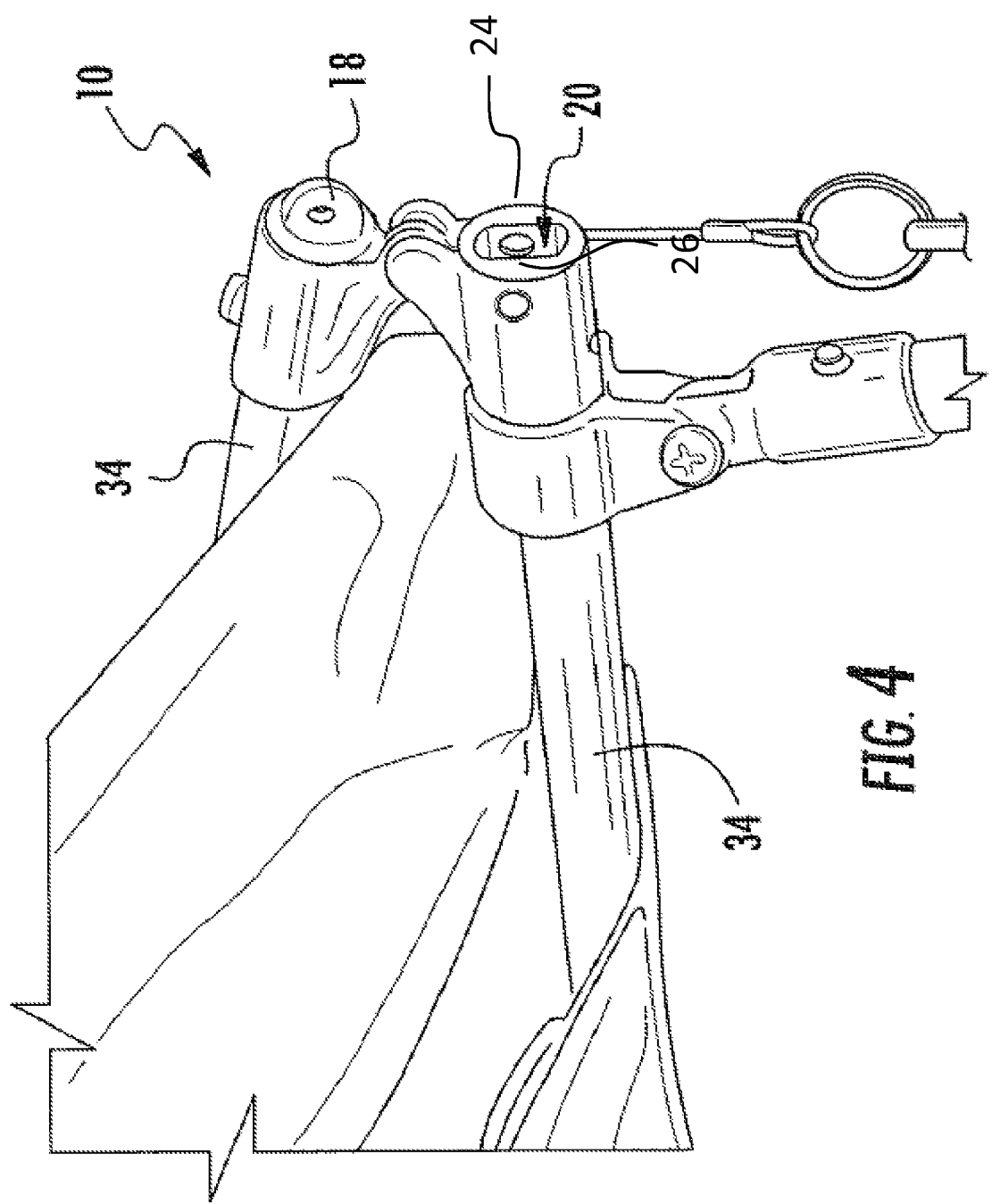
FIG. 4 is a perspective view of the hinge as shown in FIG. 1, the hinge being shown in an open configuration and in association with a frame.
Figure 5:
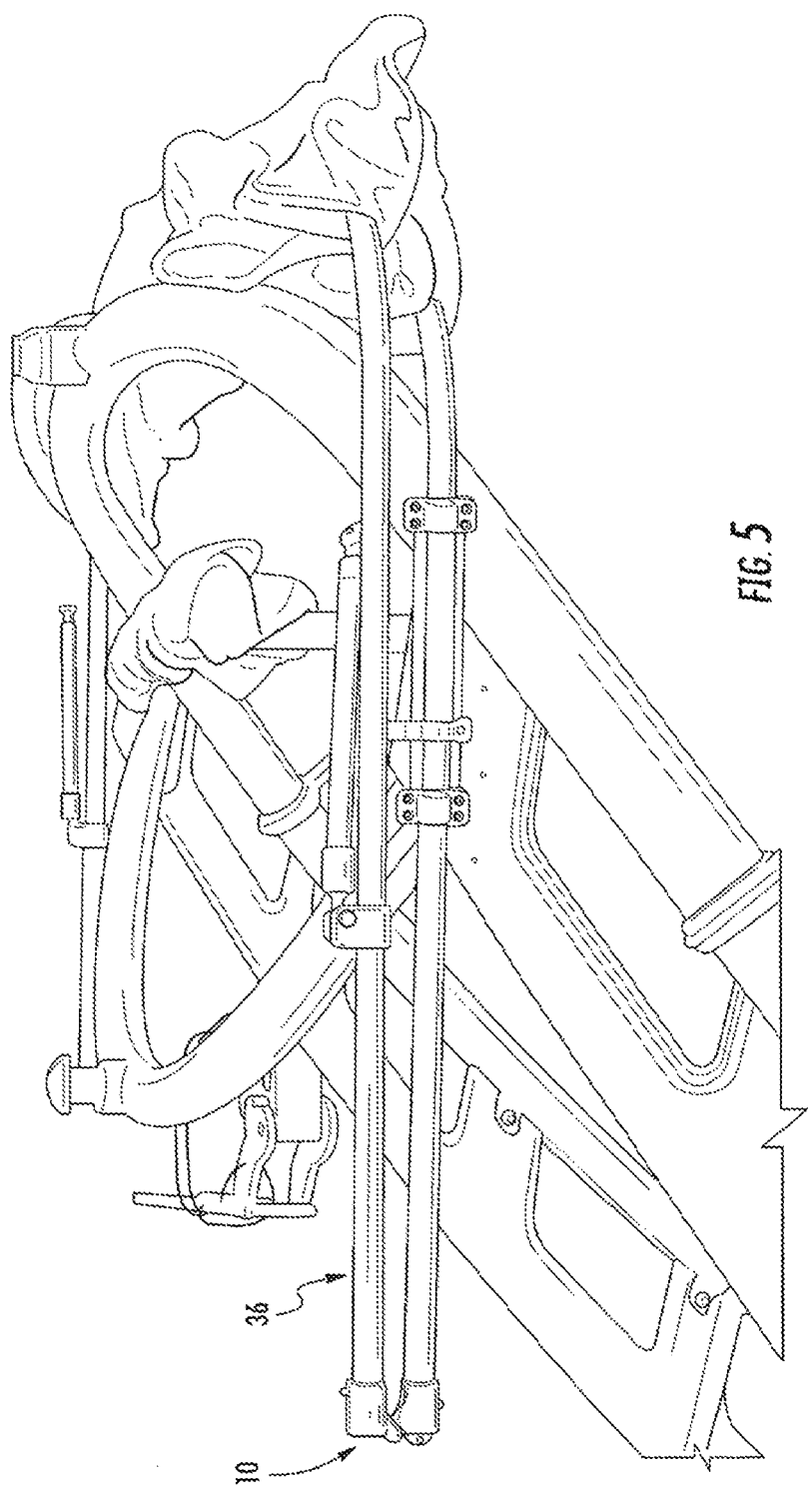
FIG. 5 is another perspective view of the hinge as shown in FIG. 1, the hinge being shown in an open configuration and in association with a frame.

In addition to inclusion of securing features such as the nesting cavity 20, nesting body 18, and the pin openings disposed therewith, the first body portion 12 and second body portion 14 also define a first frame association cavity 30 and a second frame association cavity 32. The first frame association cavity 30 is disposed at an end of the first body portion 12 that is opposite an end defining the nesting cavity 20. Similarly, the second frame association cavity 32 is disposed at an end of the second body portion 14 that is opposite an end including the nesting body 18. As shown in FIGS. 4, 5, and 6, these frame association cavities 30, 32 associate the hinge device 10 with frame portions 34 of a bimini top 36. The frame portions 34 may be secured within the cavities 30, 32 via any conventional means such as welding, mechanical fastening, or a frictional fit.

In FIGS. 4 and 5, the bimini top 36 is shown in a folded or stowed position. The top 36 may even be biased towards this folded/stowed position (via spring action, etc.). When the top 36 is in the folded position, the hinge device 10 is open, with the nesting body 18 being disposed outside of the nesting cavity 20. This is clearly shown in FIGS. 4 and 5.

However, when the bimini top 36 is configured into the open position, as shown in FIG. 6, the hinge device closes in a manner that causes the nesting body 18 to enter and be nested within the nesting cavity 20. As discussed above, such nesting aligns the pin openings 22, 24, and 26 of the body portions 12, 14 in manner that allows the pin 24 to traverse the width of the hinge device 10, and lock the hinge device 10 the closed position. This nesting also aligns the body portions 12, 14 themselves, creating stability in the hinge 10. The locking counteracts the biasing of the tensioned top towards the folded position, thereby holding the top 36 in the open position of FIG. 6.

In practice, the nesting body 18 keeps bodies 12, 14 aligned, assuring a stable hinge joint in both directions, and eliminating stress on the hinge pivot point 16. Passing of the side entry pin 28 through the outer openings 24, 26 in the two walls of the first body portion 12 (which is the forward body in an exemplary embodiment) as well as the pin opening 22 in the nesting body 18 allows for continuous support, while evenly distributing the forces on the pin 28 and stabilizing the entire assembly.

Figure 7:
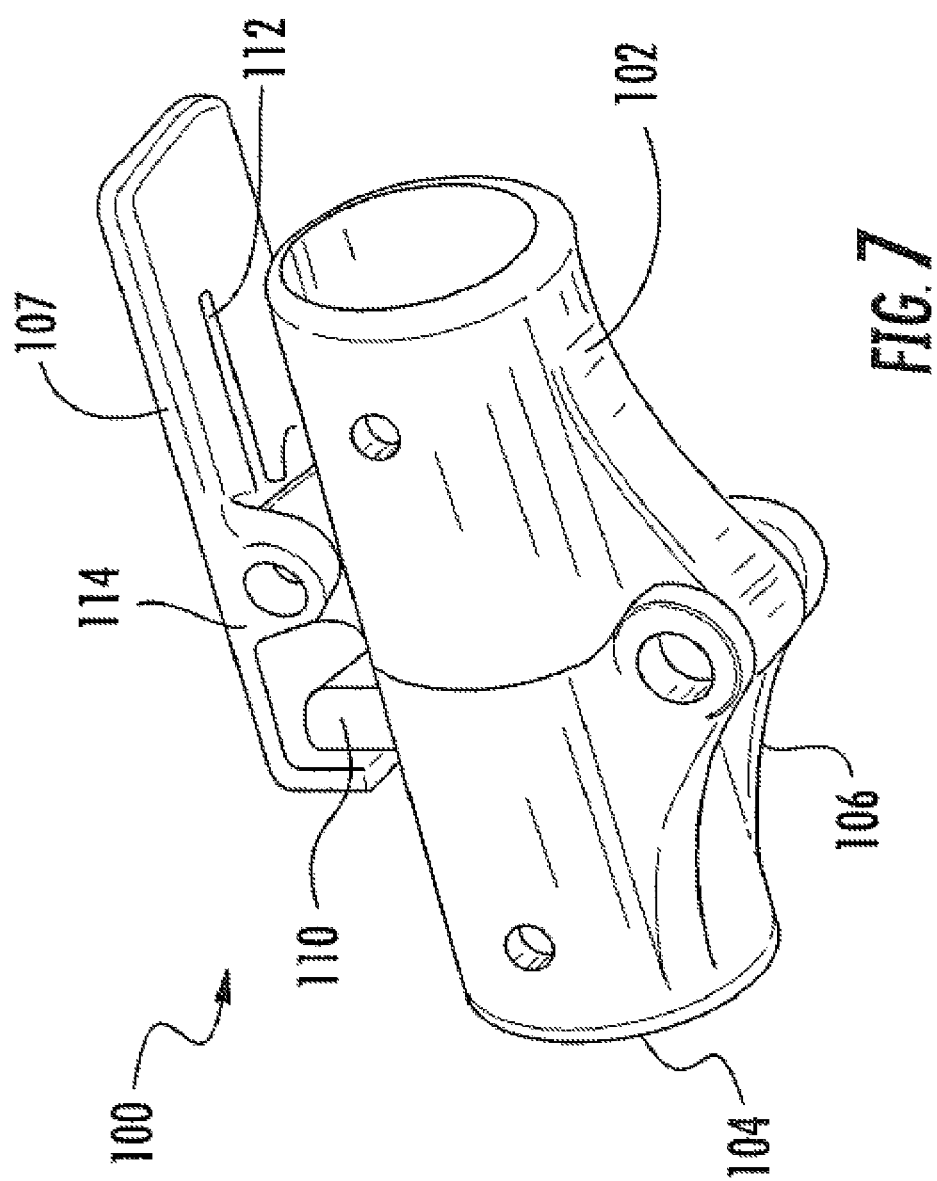
FIG. 7 is a perspective view of a hinge in accordance with another exemplary embodiment, the hinge being shown in a closed configuration.

Referring to FIG. 7, a second exemplary embodiment of a hinge device 100 for use with a bimini top is shown. Like the hinge device 10, the hinge device 100 includes a first hinge body portion 102, a second hinge body portion 104, and a pivot point 106 that associates the first and second body portions 102, 104. The pivot point 106 may be any conventional hinge association means (i.e. a riveted, pinned, or otherwise mechanically and rotatably fastened piece such as that shown in FIG. 4) that allows the first and second body portions 102, 104 to freely rotate relative to each other. The hinge device 100 also includes a spring loaded latch 107 in addition to or instead of the pin locking mechanism (with pin 28) discussed with regards to hinge device 10.

The second body portion 104 includes a nesting body (not shown, but that same or substantially the same as nesting body 18) that is configured for nesting within a nesting cavity (not shown, but that same or substantially the same as nesting cavity 20) defined by the first body portion 102. Similarly to that which is shown in FIG. 2 with reference to the device 10, the nesting body is visible when the hinge device 100 is open, with the nesting body being nested within the nesting cavity when the device 100 is closed.

As shown in FIG. 7, the second body portion 104 includes a flange 110 extending from an opposite surface from the pivot point 106. As is also shown in FIG. 7, the first body portion 102 includes the spring loaded latch 107, which, in the exemplary embodiment of FIG. 7, includes a spring 112 and latch body 114. In practice, the nesting body keeps bodies 102, 104 aligned (similarly to device 10), assuring a stable hinge joint in both directions, and eliminating stress on the hinge pivot point 106. The spring loaded latch allows for convenient and effective locking and unlocking of the portions 102 and 104 in into the closed and open positions respectively. It should be noted that the spring loaded latch 107 may be protected or shielded by a shielding channel that is open at an upper area but closed along the sides of the spring latch 107.

It should also be appreciated that the elements of devices 10 and 100 may variously be made of any desirable hinge material, such as but not limited to various metals and hard plastics.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A hinge with securing features, the hinge comprising:
   a first hinge body portion including a first frame association end and a nesting cavity, said first frame association end and said nesting cavity being disposed at opposite ends of said first hinge body portion;
   a second hinge body portion defining a second frame association end and a nesting body configured for nesting in said nesting cavity of said first hinge body portion, said second frame association end and said nesting body being disposed at opposite ends of said second hinge body portion, wherein said first hinge body portion and said second hinge body portion are rotatably associated via a pivot point such that said first hinge body portion is configured to rotate 180° relative to said second hinge body portion; and
   at least one securing feature for securing said nesting body within said nesting cavity in a manner that prevents rotation of said first body portion relative to said second body portion about said pivot point, wherein said at least one securing feature includes at least one outer pin opening extending from an outer surface of said first hinge body to said nesting cavity and at least one inner pin opening extending from a first side of said nesting body to a second, opposite side of said nesting body, said outer pin opening and said inner pin opening being axially aligned when said nesting body is fully inserted into said nesting cavity.

2. The hinge of claim 1, wherein said at least one outer pin opening communicates said nesting cavity with an environment ambient to said first hinge body portion.

3. The hinge of claim 2, wherein said at least one outer opening is a first outer opening and a second outer opening disposed at opposing widths of said first body portion, and said at least one inner pin opening is a pin opening that traverses an entire width of said nesting body, wherein said first outer opening, said second outer opening, and said inner pin opening that traverses an entire width of said nesting body are alignable when said nesting body is nested in said nesting cavity.

4. The hinge of claim 1, wherein said at least one securing feature is a spring loaded latch extending from said first body portion, said spring loaded latch being configured to prevent rotation of said first body portion relative to said second body portion via interaction with a flange extending from said second body portion.

5. The hinge of claim 1, further comprising
   at least one pin configured for disposal through said at least one outer pin opening into said at least one inner pin opening only when said nesting body is fully nested in said nesting opening.

6. The hinge of claim 5, wherein said at least one outer opening is a first outer opening and a second outer opening, the first outer opening and the second outer opening being aligned and disposed at opposing widths of said first body portion, wherein said first outer opening, said second outer opening, and said inner pin opening, and wherein said at least one pin is configured for disposal through an entire width of the hinge device via disposal through said first outer opening, said inner pin opening, and said second outer opening.

7. The hinge of claim 1, further including a first frame portion secured within a first frame association cavity defined by said frame association end and a second frame portion secured within a second frame association cavity defined by said second frame association end.

8. The hinge of claim 7, wherein said first frame portion and said second frame portion are portions of a frame for a bimini top.

9. A hinge with securing features, the hinge comprising:
   a first hinge body portion including a first frame association end and a nesting cavity, said first frame association end and said nesting cavity being disposed at opposite ends of said first hinge body portion;
   a second hinge body portion defining a second frame association end and a nesting body configured for nesting in said nesting cavity of said first hinge body portion, said second frame association end and said nesting body being disposed at opposite ends of said second hinge body portion, wherein said first hinge body portion and said second hinge body portion are rotatably associated via a pivot point such that said first hinge body portion is configured to rotate 180° relative to said second hinge body portion; and
   at least one securing feature for securing said nesting body within said nesting cavity in a manner that prevents rotation of said first body portion relative to said second body portion about said pivot point, wherein said at least one securing feature includes an outer pin opening extending through a first side and a second opposite side of said first hinge body and an inner pin opening formed in said second hinge body, wherein when said nesting body is fully positioned within said nesting cavity, said outer pin opening and said inner pin opening are axially aligned.

* * * * *